May 21, 1968   R. R. CORDELL   3,383,924
RETRACTABLE SAMPLING DEVICE FOR PRESSURIZED CONVEYORS
Filed Sept. 7, 1966
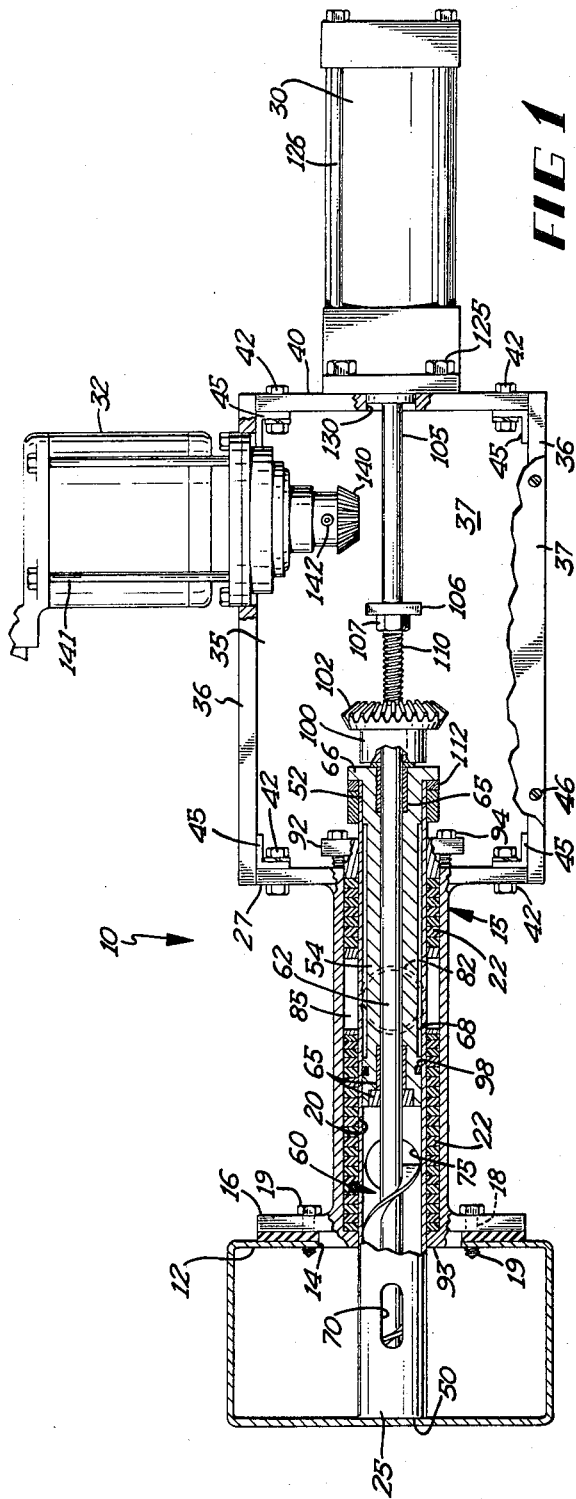
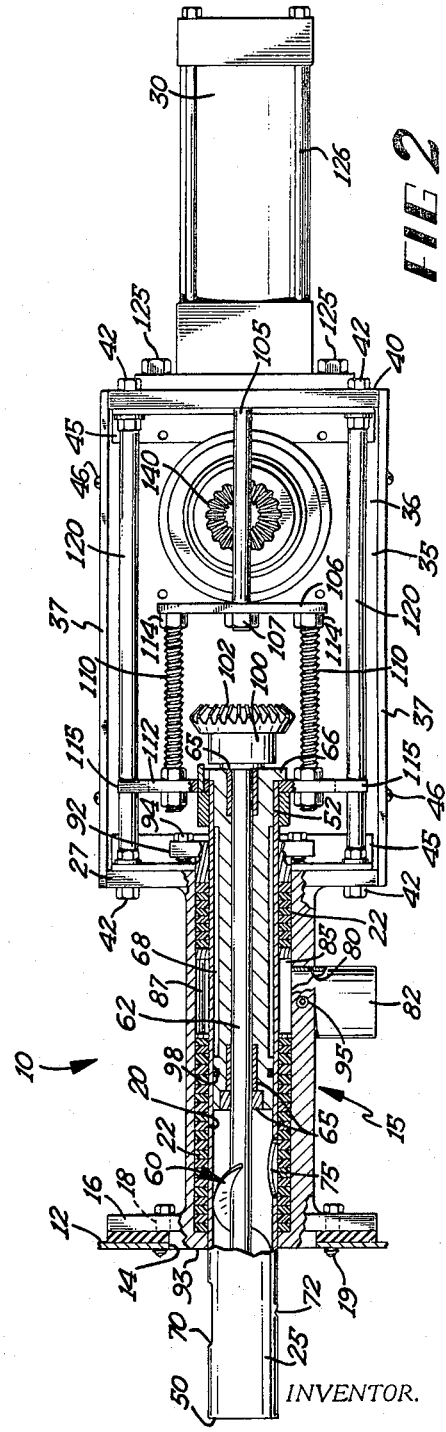
INVENTOR.
RAY R. CORDELL
BY Schroeder Siegfried
& Ryan ATTORNEYS 3,383,924
RETRACTABLE SAMPLING DEVICE FOR PRESSURIZED CONVEYORS
Ray R. Cordell, Hopkins, Minn., assignor to Gustafson Manufacturing Company, Minneapolis, Minn.
Filed Sept. 7, 1966, Ser. No. 577,686
11 Claims. (Cl. 73—422)

This invention relates to sampling devices and more particularly to an improved sampling device particularly adaptable for use in pressurized conveying lines and with finely granulated materials.

Sampling devices have previously been employed with finely granulated materials and in pressurized conveying lines. Such devices have been deficient because of the leakage about the same and the inability to accurately sample consistently. The finely granulated materials and the pressure differential the same and the inability to accurately sample consistently. The finely granulated materials and the pressure differential existing between the sampling device and conveying lines tend to clog the sample openings, build-up sample material on the sample tube and scatter the sample material as the sample is being removed. Thus, such prior devices in addition to inaccuracies under such operating conditions require extensive maintenance. The present invention is directed to an improved sampling device particularly adapted for use in pressurized conveying lines which may be mounted in any position which will positively seal the conveying line to prevent escape of material therefrom, will prevent leakage between the conveying line and the sample opening as a sample is being removed from the device and is self-cleaning so as to reduce maintenance and increase accuracy of the same. This improved sampling device includes provisions for uniformly filling the sampling tube during each sampling operation, a positive removal of all of the sampling material on each sampling cycle and utilizes a seal which minimizes wear with the movement of the sampling tube.

Therefore it is the principal object of this invention to provide an improved sampling device particularly adapted for use in presurized conveying lines.

Another object of this invention is to provide an improved sampling device particularly adapted for use with finely granulated materials.

A still further object of this invtntion is to provide an improved sampling device which may be mounted in any position and will provide positive sampling tube cleanout with each sampling operation.

Another object of this invention is to provide in an improved sampling device an improved sealing structure which prevents leakage from a pressurized conveying line and through the sampling device and which is self-cleaning.

A still further object of this invention is to provide an improved sampling device which is accurate in operation and easy to use.

These and other objects of this invention will become apparent from a reading of the attached description together with the drawings wherein:

FIGURE 1 is a plan view of the improved sampling device with parts removed, and

FIGURE 2 is a side elevation view of the improved sampling device with parts removed.

My improved sampling device for pressurized conveyors is shown generally at 10 as attached to a conveying line indicated schematically at 12. The sampling device is mounted on the walls of the conveying line at an aperture 14 therein with the conveying line adapted to transmit material to be sampled under pressure, either vacuum or above atmospheric pressures. The sampling device includes a generally tubular frame portion 15 with a circular flange 16 at one extremity, the flange 16 having suitable mounting holes 18 therein through which suitable screws 19 are adapted to secure the flange to the conveying line at the aperture 14 therein. The tubular portion of the frame of the sampling device may be positioned with respect to the conveying line in any position such that the sample opening (to be later identified) therein will face into the flow of the material in the conveying line. As such it may be inclined or horizontal and the sampling device does not rely on the force of gravity on the sampling material for transmitting the same. The tubular portion of the frame has a generally cylindrical recess 20 therein which recess is defined by a plurality of Teflon washers 22 of the chevron type positioned in stacked relationship in the interior of the tube and defining the opening or recess 20 for a sample tube 25. The other extremity of the frame includes a mounting flange 27 which forms a part of an enclosure, to be hereinafter identified, upon which is mounted a pair of drive motors indicated at 30 and 32. The enclosure mounting these motors and attached to the frame or forming a part thereof at the extremity opposite the mounting flange 16 is connected to the flange 27 to define a recessed area 35 at the opposite end of the tubular opening into which the sample tube 25 extends. The enclosure is defined by side plates 36, top and bottom plates 37, and an end plate 40 all of which are secured together through suitable means such as nuts and bolts 42. Angle iron type supporting flanges 45 positioned at the corners of this generally rectangular enclosure defined by the side plates 36, end plate 40 and flange 27 locate and secure these parts in assembled relationship. The top and bottom cover plates 37 are removably attached thereto by screw means 46.

The sampling tube 25 is a stainless steel tubular member sealed at one extremity, as at 50, and has an open extremity 52 into which a bearing support member 54 is positioned to close the same. Within the sampling tube is positioned an auger 60 having a shaft 62 which is supported in the bearing support member 54 through suitable bearing member 65. The auger 60 extends from the sealed extremity 50 of the sampling tube over part of the extent of the same, shown as substantially half of the length in the drawings. This auger is mounted in cantilever fashion by the support member 54 and bearings 65, the former being pressed fitted into the end of the sampling tube and having a flanged extremity 66 limiting the movement of the same. This support member is relieved as at 68 to facilitate insertion into the sampling tube and suitable screw means (not shown) may be utilized to rigidly fix the support member 54 in the end of the sampling tube.

Positioned near the closed or sealed extremity 50 of the sampling tube is an elongated sample entrance opening 70 with a small vent aperture 72 being positioned diametrically opposite the same to permit air to flow through the sampling tube and facilitate the entrance of the material being sampled into the sampling tube through the entrance opening 70. Near the opposite end of the auger and adjacent the support member 54 is positioned an exit opening 75 for the sampling tube, this opening being the passage by means of which the material being sampled is removed from the sampling tube through rotation of the auger.

The sampling tube 25 is adapted to be reciprocated in the tubular opening in the frame from an extended to a retracted position. In the extended position, the sampling tube projects beyond the mounting flange and into the conveying line a predetermined distance such that the sample opening 70 in the tube is exposed to the passage of material in the conveying line, and the vent hole 72 opposite the same and normally positioned downstream of the flow of material within the tube is also exposed. This will facilitate entrance of the material being sampled into the sampling tube adjacent the auger. In this extended position, the outlet opening 75 of the sampling tube is positioned within the tubular recess 20 at a point where it is sealed being disposed in an area where the cylindrical type Teflon washers 22 define a solid cylinder journaling and supporting the sampling tube. The tubular portion 15 of the frame includes a cylindrical recess or aperture 80 with the tubular outlet spout 82 positioned therein to define an access or outlet opening in the frame by means of which sample material is removed from the sampling device. This aperture 80 and the outlet spout are positioned adjacent and in communication with a cylindrical recessed area 85 in the Teflon washers 22 which recess is defined by a plurality of spacer members 87 positioned about the recess in the frame in which the Teflon washers are positioned. Several such spacers are located about the periphery of this opening and an end flange 92 is positioned adjacent the end of the stacked washers in the tubular frame and is secured thereto by bolts 94 to clamp the washers 22 and spacers 87 in a stacked relationship to define the cylindrical opening in which the sampling tube is positioned or mounted. The Teflon washers are held in a stacked relationship by means of a flange portion 93 at the flange 16 of the tubular frame 15 and are clamped between this flange and the cylindrical or annular clamping bracket 92 which is attached to the flange 27 through the bolts 94, the latter being threaded into tapped apertures (not shown) in the flange 27 to clamp the Teflon washers in assembled relationship. This mounting of the Teflon washers will journal the stainless steel tube for the reciprocating motion between retracted and extended positions and will closely fit thereon to remove any sample material from the outer periphery of the tube as the tube is retracted and extended in the frame 15. Thus as the sampling tube is moved from the extended position, in which the sample opening 70 is exposed in conveying tube, the retracted position of the sampling tube will be wiped by the fit of the washers mounting the same. In the retracted position of the sampling tube the closed extremity 50 will be positioned adjacent the flange 16 and substantially flushed therewith. In this retracted position, the aperture 75 in the sampling tube will align with the cylindrical recess 85 providing communication from the interior of the sampling tube through this recess to the outlet spout or tube 82. The latter is held in position in the tubular portion 15 of the frame by suitable screw means such as is indicated at 95. The interior of the sampling tube is sealed at the support member 54 through a sealing ring 98 and the bearings 65 so that upon rotation of the auger, all sample material will be removed through the opening 75 therein.

The end of the shaft 62 of the auger extends beyond the flanged end 66 of the support member 54 and mounts a hub 100 with a spur gear 102 thereon. In the retracted position, this spur gear and hub extremity 100 of the shaft along with the sampling tube will be moved within the confines 35 of the enclosure toward the opposite extremity of the same. This reciprocating movement of the sampling tube is effected by the actuator 30 which is of the hydraulic type and adapted to be positioned between two extreme positions which will displace the sampling tube connected thereto between the retracted and extended positions. Thus the actuator 30 has an output shaft 105 which is connected to a yoke-like connecting structure formed by a plate 106 secured to the end of the shaft 105 through a nut 107, the plate 106 mounting a pair of threaded bolt members 110 which in turn mount at their opposite extremity a connecting guide plate 112. Plate 112 is held in position on the sampling tube by means of the flange portion 66 and slots in the same to provide a releasable type connection thereto. Suitable nuts 114 positioned on the threaded bolts 110 on either side of the plate secure the guide plate thereto. In addition, the extremities of the guide plates, as indicated at 115, are guided on a pair of guide rods 120 positioned to extend across the length of the enclosure between the end plates 27 and 40 parallel to the extent of the sampling tube and shaft 105 for the purpose of guiding the plate 112 and hence the tube 25 as it is reciprocated. Primarily these guide rods prevent rotation of the sampling tube as the gear 102 of the auger is rotated, as will be hereinafter identified. The guide rods 120 are suitably secured to the end plates through bolt means and flanges (not shown).

Motor 30 is mounted on the end wall or flange 40 through suitable bolt means 125 and tie rods 126 with its shaft 105 extending through an aperture 130 in the end wall. The bidirectional movement of the actuator 30 will cause the sampling tube connected thereto to be moved between retracted and extended positions. As the sampling tube is retracted within the recess 35 of the enclosure, the hub end of the same is moved into meshing contact with a spur gear 140 connected to the output shaft of motor 32. This latter motor is of the electrical type and is suitably secured to one of the side plates 36 by means of elongated bolts 141 which thread into the plate 36 to secure the same thereon. The spur gear hub 140 is suitably secured to the operating shaft through a key or set screw 142 in a conventional manner. This extremity of the motor with the spur gear thereon is so positioned as to clear engagement with the plate 106 as it is reciprocated through operation of the motor 30. Thus the gear teeth of the spur gears 102 and 140 will meet in meshing relationship to rotate whenever the actuator 30 is in the fully retracted position. This will correspond to the fully retracted position of the sampling tube 25 such that the closed extremity 50 of the same will be substantially flush with the interior surface of the flange 16 and the inner wall of the conveying conduit 12. In this position, the sample opening 70 and the vent hole 72 in this extremity of the sample tube will be positioned within the confines of the tubular frame 15 and sealed therein. Engagement of the gears and energization of the motor 32 will cause the shaft 62 to rotate, rotating the auger 60 within the sampling tube and causing material picked up by the sampling tube through the aperture 70 to be moved along the extent of the tube to the outlet hole 75, which in he retracted position will correspond and align with the recessed opening 85 and the outlet tube 82 in the frame 15. The bolts 110 connecting the plates 106 and 112 are adjustable to accurately position the gears in meshing relationship for the retracted position of the actuator and the retracted position of the sampling tube 25.

The improved sampling device for pressurized conveying lines will be operated in a stepped sequence. The sampling tube will be reciprocated between extended and retracted position in any desired time sequence through selective and timed energization of the hydraulic motor 30. Thus the sampling tube may remain extended for given periods in a conventional manner and be retracted for given periods in a conventional manner and be retracted for given periods which periods are adjustable through suitable control circuitry (not shown). Such controls may vary in form and form no part of the present invention. In the retracted position of the sampling tube, the gearing 102 and 140 of the auger shaft and motor respectively engage and selective energization of the motor 32 at this time provides rotation of the auger for select periods to remove the sample from the sampling tube. Such controlled energization will be effected through suitable control circuitry which will be coordinated with energization and operation of the hydraulic actuator 30.

The improved sampling device is slidably mounted in a sleeve-like portion of the frame 15 and is sealed in its mounting on the conveying line so that leakage will not occur therebetween. Similarly the movable sampling tube is provided with suitable sealing means so that the sample material under pressure cannot escape therefrom and through the sampling device except through the sampling tube and into the sample outlet thereof in the retracted position of the sampling device. In addition, the improved sampling tube includes provisions for venting the same so that the sample material may be directed through the aperture in the sampling tube for the purpose of collecting a sample therein. The finely granulated material which is normally conveyed under pressure or vacuum further has the tendency to adhere to surfaces requiring maintenance to clean the same. In my improved sampling device, the stainless steel tube mounted and journaled in the Teflon washers which provide a cleaning as well as a journaling action to insure that build-up of the sample material along the tube surface will be prohibited and that the tube may be positively sealed as well as journaled within the mounting frame. In addition, the sample opening in the end of the tube will be completely sealed from the conveying line in the retracted position as will the sampling outlet opening be sealed within the sample tube whenever the sample tube is extended collecting a sample. This will insure that particles of the material being sampled will not be directed through the sampling device except when the sample has been collected and is being dispensed therefrom.

This improved sampling device may vary in form and shape and may be utilized in any angle position of mounting on the conveying line since it relies on positive clean-out of the sample tube through operation of an auger therein. Such an auger is, however, operative only whenever the sample tube is in a retracted position and ready to dispense a sample. This simplifies the mounting of its drive motor making it easy to build and maintain.

Therefore in considering this invention it should be remembered that the present disclosure is intended to be illustrative only and the scope of the invention should be determined by the appended claims.

What is claimed is:

1. A sampling device for pressurized conveying lines comprising, a frame having a tubular portion with a flange at one extremity adapted to be mounted on a conveying line for material to be sampled and conveyed under pressure, said flange being adapted to be positioned around an aperture in the conveying line, a sampling tube sealed at one extremity and slidably mounted in the tubular portion of the frame being adapted to move between an extended position wherein the sampling tube projects out of the tubular portion a given distance and a retracted position wherein the sampling tube is positioned within the tubular portion with its sealed extremity substantially flush with the end of tubular portion, motive means for reciprocating the sampling tube within the tubular portion between said positions, said sampling tube having a sample opening positioned therein and exposed in the portion of the sampling tube which projects beyond the end of the tubular portion of the frame in said one of said positions, auger means positioned within the sampling tube and having an actuating shaft extending out of the sampling tube in the retracted position, said frame having an opening in the tubular portion thereof and adapted to mate with a second opening in the sampling tube remote from the sample opening, and means coupled to the shaft of the auger in the retracted position of the sampling tube and adapted to rotate the same and transport material in the sampling tube to the opening in the tubular portion of the frame to discharge the sample material.

2. The sampling device for pressurized conveying lines of claim 1 in which the sampling tube includes an additional vent opening to facilitate movement of the material in the conveying line in the sampling tube through the sample opening during a sampling period.

3. The sampling device for pressurized conveying lines of claim 2 in which the motive means for reciprocating the sampling tube within the tubular portion of the frame is a two-position hydraulic actuator, and in which the means coupled with the shaft of the auger is a rotating means which is engaged only when the hydraulic actuator is actuated to a position wherein the sampling tube is retracted.

4. The sampling device for pressurized conveying lines of claim 3 in which the auger means has a spur gear at the end of the same, and the rotating means for the auger includes an electric motor having a cooperating spur gear adapted to mesh with the spur gear on the auger whenever the hydraulic actuator positions the sampling tube within the frame in the retracted position.

5. The sampling device for pressurized conveying lines of claim 4 in which the sampling tube is made of a metallic material and the tubular portion of the frame includes in part a cylindrical sleeve slidably mounting a sampling tube therein and enclosing the same in a pressurized connection to journal the tube therein, preventing build-up of material on the sampling tube and air leakage between the sampling tube in the frame except through the interior thereof.

6. The sampling device for pressurized conveying lines of claim 5 in which the sampling tube has the auger positioned therein over a partial extent of the same from the sealed extremity of the sampling tube and including a bearing support for the auger positioned in the remaining portion of the tube and sealed therein to journal said auger.

7. The sampling device for pressurized conveying lines of claim 6 in which the sampling tube is journaled in the tubular portion of the frame through a Teflon sleeve formed by a plurality of washer members held in a stacked relationship to support the sampling tube and to seal the same in the frame effecting clean-off of material on the outer peripheral surface of the sampling tube as it is moved between extended and retracted positions.

8. The sampling device for pressurized conveying lines of claim 7 and including means connecting said motive means to the sampling tube for reciprocating the same which also prevents rotation of the sampling tube in the tubular portion of the frame upon rotation of the auger.

9. A sampling device for pressurized conveying lines comprising, a frame, a tubular passage through the frame, a mounting flange at one end of the frame and adapted to mount the sampling device on a pressurized conveying line, a cylindrical sampling tube sealed at one extremity and positioned in the tubular passage, an auger positioned in the sampling tube and extending over a portion of the length of the same, support means mounting and journaling the auger positioned in the remaining portion of the sampling tube and sealing the other extremity thereof, said sampling tube being slidably mounted in the tubular passage of the frame between a retracted position wherein the sealed extremity is flush with the frame to an extended position wherein the sealed extremity of the sampling tube extends beyond the surface of the frame, said sampling tube having a sample entrance passage opening positioned near said sealed extremity which is exposed beyond the frame when the sampling tube is in the extended position, said sampling tube having a sample exit passage positioned intermediate the extent of the tube and adjacent the end of the auger and the support means mounting the same, said frame having a passage adapted to mate with the sample exit passage in the sampling tube when the sampling tube is in a retracted position to permit passage of the sample material from the tube with rotation of the auger, means for reciprocating the sample tube between retracted and extended positions, means for rotating the auger when the sampling tube is in a retracted postion, and means for journaling the sampling tube in the tubular passage for reciprocal movement and sealing the sampling tube therein.

10. The sampling device for pressurized conveying lines of claim 9 in which the means journaling the sampling tube for reciprocal movement in the tubular passage includes a plurality of concentrically mounted Teflon washers held in stacked relationship in the tubular passage of the frame and supporting the sampling tube therein.

11. The sampling device for pressurized conveying lines of claim 10 in which the means for reciprocating the sampling tube between retracted and extended positions includes a motive means and a coupling means permitting reciprocal movement but preventing rotative movement of the sampling tube with rotative movement of the auger.

References Cited

UNITED STATES PATENTS

| | | | |
|---|---|---|---|
| 1,860,107 | 5/1932 | Lien | 73—421 |
| 2,682,772 | 7/1954 | Peterson | 73—422 |
| 2,683,373 | 7/1954 | Gallup et al. | 73—422 |
| 3,217,547 | 11/1965 | Cordell et al. | 73—422 |
| 3,276,264 | 10/1966 | Banks | 73—422 |

DAVID SCHONBERG, *Primary Examiner.*

DANIEL M. YASICH, *Examiner.*